(12) United States Patent
Han et al.

(10) Patent No.: US 12,381,730 B2
(45) Date of Patent: Aug. 5, 2025

(54) DYNAMIC AND VERIFIABLE SEARCHABLE ENCRYPTION METHOD AND SYSTEM BASED ON UPDATABLE ENCRYPTION AND BLOCKCHAIN

(71) Applicant: Hangzhou City University, Hangzhou (CN)

(72) Inventors: Song Han, Hangzhou (CN); Yuxuan Fang, Hangzhou (CN); Siqi Ren, Hangzhou (CN); Xuanxuan Xu, Hangzhou (CN)

(73) Assignee: Hangzhou City University, Hangzhou (CN)

( * ) Notice: Subject to any disclaimer, the term of this patent is extended or adjusted under 35 U.S.C. 154(b) by 278 days.

(21) Appl. No.: 18/316,091

(22) Filed: May 11, 2023

(65) Prior Publication Data

US 2024/0015014 A1 Jan. 11, 2024

(30) Foreign Application Priority Data

Jul. 11, 2022 (CN) .......................... 202210810675.7

(51) Int. Cl.
| | |
|---|---|
| H04L 29/06 | (2006.01) |
| H04L 9/00 | (2022.01) |
| H04L 9/06 | (2006.01) |
| H04L 9/08 | (2006.01) |
| H04L 9/32 | (2006.01) |
| H04L 9/40 | (2022.01) |

(52) U.S. Cl.
CPC ............... *H04L 9/32* (2013.01); *H04L 9/065* (2013.01); *H04L 9/0891* (2013.01); *H04L 9/3242* (2013.01); *H04L 9/50* (2022.05); *H04L 63/0428* (2013.01)

(58) Field of Classification Search
None
See application file for complete search history.

(56) References Cited

U.S. PATENT DOCUMENTS

2019/0349426 A1* 11/2019 Smith ................. H04L 41/0806

FOREIGN PATENT DOCUMENTS

WO WO-2020125839 A1 * 6/2020 ............. G06F 21/31

* cited by examiner

*Primary Examiner* — Andrew J Steinle
(74) *Attorney, Agent, or Firm* — Hemisphere Law, PLLC; Zhigang Ma

(57) ABSTRACT

A dynamic and verifiable searchable encryption method based on updatable encryption and blockchain and a system thereof are provided. The method is suitable for the real scene where the data user and the data owner are not the same party. The method adopts the updatable technology to update the secret key in the searchable encryption, and the security of the key update could achieve Chosen Ciphertext Security (CCA) and Ciphertext Integrity (CTXT) security. In addition, the method is used to judge whether the cloud server is "trustworthy" by verifying the search results publicly based on the blockchain. Therefore, the verifiable dynamic searchable encryption method based on updatable encryption and blockchain has been greatly improved in terms of practicability and security.

9 Claims, 1 Drawing Sheet

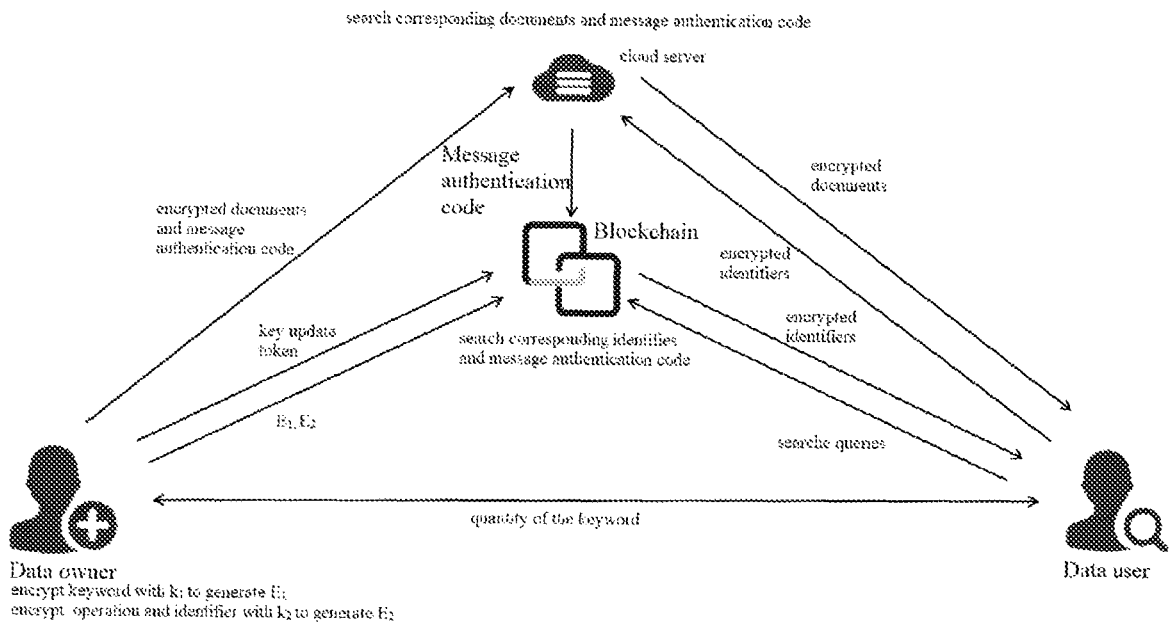

DYNAMIC AND VERIFIABLE SEARCHABLE ENCRYPTION METHOD AND SYSTEM BASED ON UPDATABLE ENCRYPTION AND BLOCKCHAIN

TECHNICAL FIELD

The disclosure relates to the field of searchable encryption, and particularly to a dynamic and verifiable searchable encryption method based on updatable encryption and blockchain and a system thereof.

BACKGROUND

On the one hand, searchable encryption based on the cloud storage can solve the problem that the data volume of the client is too large to be stored, and on the other hand, it provides search function for the encrypted data stored on the cloud server, which has great practicability and scalability. In the existing searchable encryption methods, the secret key is always shared by the data user and the data owner, which requires the data user to be completely trusted, which has high security requirements for the data user. Data integrity and confidentiality cannot be guaranteed. The updatable encryption can update the secret key of the encrypted indexes without downloading the data stored on the cloud service, which greatly reduces the storage and computation overhead of the data owner. In addition, by verifying the search results through the blockchain, the correctness, accuracy and confidentiality of the search results have been greatly improved.

SUMMARY

To make up for the deficiencies of the related art, the disclosure provides a dynamic and verifiable searchable encryption method based on updatable encryption and blockchain and a system thereof.

The technical solution of the disclosure is:

The data owner encrypts and uploads the document to the cloud server, and generates a corresponding message authentication code for each document; the message authentication code is uploaded to the cloud server and the blockchain;

During the process of update, the data owner obtains the keyword w, the identifier of the document containing the keyword w, and the corresponding operation; the data owner confirms whether the keyword w to be updated is initialized, and if the keyword w has not been initialized, the global counter of the keyword w is initialized to 0 and incremented by 1; if the keyword w has been initialized, the global counter of the keyword is directly incremented by 1.

The data owner encrypts the keyword to generate the first encryption result $E_1$; the data owner encrypts the operation of the data and the identifier of the document to generate the second encryption result $E_2$; and sends $E_1$ and $E_2$ to the blockchain;

When a data user needs to search for a keyword w, the data owner queries the quantity of the keyword w stored on the cloud server, and encrypts the quantity and sends it to the data user; the data user generates a list, which contains the data to be searched. The keyword w corresponds to where the entry is stored in the blockchain, and the data user sends the list to the blockchain.

The blockchain finds the corresponding second encryption result $E_2$ and the corresponding message authentication code value according to the values in the list, and calculates the XOR value of the message authentication code; the blockchain sends the queried second encryption result $E_2$ to the data user.

The data user decrypts the second encryption result $E_2$ in order to obtain the identifiers of the documents containing the keyword w; the data user sends the decrypted values of identifiers to the cloud server.

The cloud server returns the corresponding documents to the data user according to the identifiers, and at the same time sends the corresponding message authentication codes of the documents to the blockchain, and the blockchain calculates the XOR value again; the blockchain compares the two XOR values, in order to verify the correctness of the documents returned by the cloud server.

Beneficial effects of the disclosure are as follows. The disclosure is suitable for the real scene where the data user and the data owner are not the same party, and we use the address mapping method to improve the efficiency in the search process. In addition, the method of the disclosure for updating the ciphertext achieves the security of CCA and CTXT, and the verification function is implemented by verifying the XOR value of the message authentication code based on the blockchain, which improves the efficiency of verification. Through these technical methods, the disclosure can greatly improve the integrity and confidentiality of the ciphertext while ensuring the efficiency.

BRIEF DESCRIPTION OF A DRAWING

FIG. 1s a schematic diagram of data information flow according to an embodiment of the disclosure.

DETAILED DESCRIPTION OF THE EMBODIMENTS

The disclosure includes the following steps.
1) The data owner uses the key k to generate two subkeys $k_1$ and $k_2$.
2) The data owner initializes two maps: the first map is used to store encrypted entries to send to the blockchain; the second map is stored locally and uses a global counter to record the number of keywords update.
3) The data owner encrypts and uploads the documents to the cloud server, and generates a corresponding message authentication code for each document.
4) The message authentication code is uploaded to the cloud server and blockchain.
5) During the process of update, the data owner obtains the keyword w, the identifier of the documents that containing the keyword, and the corresponding operation, such as adding or deleting the entry of the document containing the keyword w.
6) During the process of update, the data owner first confirms whether the keyword to be updated is initialized through the second map. If the keyword has not been initialized, the global counter of the key is initialized to 0 and incremented by 1.
7) During the process of update, if the key has been initialized, the data owner increments the global counter of the key by 1.
8) The data owner encrypts the keyword symmetrically with the key $k_1$ to generate $E_1$; the operation (add or del) on the data, and the document identifier is symmetrically encrypted with the key $k_2$ to generate $E_2$.
9) The data owner sends E 1, $E_2$ to the blockchain.

10) $E_1$ and $E_2$ are stored on the blockchain and connected through a spatial mapping relationship.

11) When a data user needs to search for a keyword w, the data owner first queries the quantity of the keyword stored on the cloud server according to the second map, and encrypts the quantity with the key k and sends it to the data user.

12) The data user generates a list of $E_1$ based on the number, which is essentially search token for the keyword to be searched.

13) The data user sends the list to the blockchain, and the blockchain finds the corresponding second encryption result $E_2$ and the corresponding message authentication code value according to the value in the list, that is, the search token and the mapping relationship between $E_1$ and $E_2$, and then calculates the XOR value of the message authentication codes.

14) The blockchain sends the queried second encrypted result $E_2$ to the data user.

15) The data user decrypts $E_2$ according to the secret key $k_2$ to obtain the identifiers of the documents that containing the keyword.

16) The data user sends the decrypted identifiers to the cloud server, the cloud server returns the corresponding documents to the data user, and sends the message authentication codes corresponding to the documents to the blockchain, and the blockchain calculates the XOR value again.

17) The blockchain compares the two XOR values. If the two comparison results are the same, it means that the cloud server has performed this operation normally.

18) During the key update process, the data owner uses the key update token to send to the blockchain, and the blockchain calculates on the encrypted database according to the algorithm requirements to change the secret key, and the encrypted database is composed of encrypted entries.

Preferably, in step 1): use the key k to generate two sub-keys which are generated by the method of XOR. Among them, the first subkey is to encrypt the keywords, and the second subkey is to encrypt the update method and the document identifier.

Preferably, in step 1): before encrypting the data to be uploaded to the cloud, the data needs to be firstly preprocessed, that is, extracing keyword/identifier pairs from documents.

Preferably, in step 2): in order to store the number of updates of each keyword, it needs to maintain a state for each keyword (the second map refers to this state), that is, the global counter. The global counter incremented by 1 if the database is updated. The purpose of the global counter is to use the number of times to search for keywords in the next search process.

Preferably, in step 10): the keyword is encrypted to generate $E_1$, the operation and identifier is encrypted to generate $E_2$, and $E_1$ and $E_2$ are sent to the blockchain. The blockchain stores $E_1$ and $E_2$ through spatial mapping, and maps each keyword to the identifier of the encrypted document. In this way, the search efficiency can be improved while ensuring security.

Preferably, after the data owner updates the ciphertext, the key previously obtained by the data user is invalid. In the absence of knowing the trustworthiness of the data user, this method can ensure the non-disclosure and security of the key to the greatest extent, and can also ensure the integrity and confidentiality of the ciphertext.

Embodiment

As shown in FIGURE, before encrypting the data to be uploaded to the cloud, the data needs to be preprocessed. Extracting keyword/document identifier pairs from documents. Then the data owner uses the key k to generate two subkeys $k_1$ and $k_2$ by means of XOR.

In the initialization phase, two maps are initialized, the first map is used to send to the blockchain to store encrypted entries, and the second map is used to store locally. At the same time, during the initialization phase, the data owner encrypts each document, generates a message authentication code, and then uploads the message authentication code to the cloud server and blockchain.

During the update process, the data owner first confirms whether the key to be updated is initialized through the second map. If the key has not been initialized, the global counter of the key is initialized to 0 and incremented by 1. If the keyword has been initialized, add 1 directly. Then, the data owner uses the key $k_1$ to encrypt the keyword to generate $E_1$, and uses the key $k_2$ to encrypt the update method to generate $E_2$. Send $E_1$ and $E_2$ to the blockchain, and the blockchian stores $E_1$ and $E_2$ through an address mapping.

The next step is the search process. When the data user needs to search for the keyword w, the data owner firstly queries the quantity of the keyword w in the mapping. The data owner sends the quantity to the data user. It then generates a list which includes the locations where the corresponding entry is stored on the blockchain. This list is sent to the blockchain, and the blockchain finds the corresponding $E_2$ according to the $E_1$ in the list, sends the encrypted $E_2$ to the data user, and calculates the corresponding message authentication code. The data user decrypts $E_2$ according to the key $k_2$ to obtain the identifiers of the documents containing the keyword, and sends the identifiers to the cloud server. The cloud server returns the corresponding documents to the data user, and sends the message authentication code to the blockchain, and the blockchain compares the XOR values of the two message authentication codes. During the key update process, the data owner uses the key update token to send to the blockchain, and the blockchain calculates on the encrypted database according to the algorithm requirements, so as to achieve the function of changing the key without decrypting the database.

The invention can update the secret key without downloading the ciphertext stored in the cloud, which not only ensures the security, but also reduces the communication overhead and computation overhead of the data owner. The invention realizes the purpose of verifying the search result based on the message authentication code on the blockchain, and greatly improves the verification efficiency. By adopting the above technical means, the disclosure can greatly improve the integrity and confidentiality of the ciphertext while ensuring the efficiency.

What is claimed is:

1. A dynamic and verifiable searchable encryption method based on updatable encryption and blockchain, comprising:
a data owner encrypting and uploading documents to a cloud server, and generating a message authentication code for each of the documents, wherein the message authentication code is uploaded to the cloud server and a blockchain;

the data owner obtaining a keyword w, an identifier of each of the documents and a corresponding operation of a data during a process of update, wherein the identifier of the each of the documents comprises the keyword w;

the data owner confirming whether the keyword w to be updated is initialized, wherein if the keyword w has not been initialized, a global counter of the keyword w is initialized to 0 and incremented by 1 and if the keyword w has been initialized, the global counter of the keyword w is directly incremented by 1;

the data owner encrypting the keyword w to generate a first encryption result $E_1$, encrypting the corresponding operation of the data and the identifier of the each of the document to generate a second encryption result $E_2$, and sending the $E_1$ and the $E_2$ to the blockchain;

while a data user searching for the keyword w, the data owner querying a quantity of the keyword w stored on the cloud server, encrypting the quantity of the keyword w and sending the quantity of the keyword w to the data user;

the data user generating a list and sending the list to the blockchain, wherein the list comprises a data to be searched, and the keyword w corresponds to an entry, wherein the entry is stored in the blockchain;

the blockchain finding the second encryption result $E_2$ and a value of the message authentication code according to values in the list, calculating an exclusive OR (XOR) value of the message authentication code and sending the second encryption result $E_2$ to the data user;

the data user decrypting the second encryption result $E_2$ in order to obtain decrypted values of the identifiers of the documents containing the keyword w and sending the decrypted values of the identifiers of the documents to the cloud server;

the cloud server returning the documents to the data user according to the identifiers, and at the same time sending the message authentication codes of the documents to the blockchain, and the blockchain calculating the XOR value again, comparing the two XOR values, in order to verify a correctness of the documents returned by the cloud server.

2. The dynamic and verifiable searchable encryption method based on updatable encryption and blockchain according to claim 1, further comprising:

the data owner utilizing a key k to generate two subkeys $k_1$ and $k_2$, wherein one is used for encryption of keywords and another is used for encryption of an update method and the identifier of the documents.

3. The dynamic and verifiable searchable encryption method based on updatable encryption and blockchain according to claim 2, wherein the key k generates two sub-keys by means of XOR.

4. The dynamic and verifiable searchable encryption method based on updatable encryption and blockchain according to claim 2, wherein the data owner encrypts the keyword w by $k_1$, and encrypts the identifier of the document and the corresponding operation by $k_2$.

5. The dynamic and verifiable searchable encryption method based on updatable encryption and blockchain according to claim 1, further comprising:

the data owner initializing two maps, wherein a first map is used to store encrypted entries, sending the encrypted entries to the blockchain, wherein a second map is stored locally in the blockchain, and uses the global counter to record times of updating the keyword w.

6. The dynamic and verifiable searchable encryption method based on updatable encryption and blockchain according to claim 5, wherein the data owner confirms whether the keyword w to be updated is initialized through the second map during the process of update.

7. The dynamic and verifiable searchable encryption method based on updatable encryption and blockchain according to claim 1, wherein the first encryption result $E_1$ and the second encryption result $E_2$ are stored on the blockchain, and connected by a spatial mapping relationship.

8. The dynamic and verifiable searchable encryption method based on updatable encryption and blockchain according to claim 1, wherein the data owner encrypts the update method and the identifier of the document by means of XOR.

9. The dynamic and verifiable searchable encryption method based on updatable encryption and blockchain according to claim 1, wherein when the keys $k_1$ and $k_2$ are updated, the data owner sends a key update token to the blockchain, the blockchain performs calculations on an encrypted database to replace the keys.

* * * * *